United States Patent
Zhou et al.

(10) Patent No.: US 11,965,621 B2
(45) Date of Patent: Apr. 23, 2024

(54) MOUNTING BRACKET

(71) Applicant: ZHONGSHAN MEITU PLASTIC IND. CO., LTD., Zhongshan (CN)

(72) Inventors: Wenhui Zhou, Zhongshan (CN); Hai Zhang, Zhongshan (CN); Haojia Huang, Zhongshan (CN); Jiafu Ma, Zhongshan (CN); Weinan Liang, Zhongshan (CN)

(73) Assignee: ZHONGSHAN MEITU PLASTIC IND. CO., LTD., Zhongshan (CN)

( * ) Notice: Subject to any disclaimer, the term of this patent is extended or adjusted under 35 U.S.C. 154(b) by 141 days.

(21) Appl. No.: 17/695,840

(22) Filed: Mar. 16, 2022

(65) Prior Publication Data
US 2023/0138187 A1 May 4, 2023

(30) Foreign Application Priority Data

Oct. 29, 2021 (CN) .......................... 202122642278.7

(51) Int. Cl.
*F16M 13/02* (2006.01)
*E03D 11/13* (2006.01)

(52) U.S. Cl.
CPC ........... *F16M 13/02* (2013.01); *E03D 11/135* (2013.01); *F16M 2200/025* (2013.01)

(58) Field of Classification Search
CPC ..... E03D 11/135; E03D 11/146; F16M 13/02; F16M 2200/025
See application file for complete search history.

(56) References Cited

U.S. PATENT DOCUMENTS

| | | | | | |
|---|---|---|---|---|---|
| 5,090,064 | A | * | 2/1992 | Breitenberger | E04C 2/384 4/252.2 |
| 5,167,040 | A | * | 12/1992 | Lechner | E03C 1/324 4/252.2 |
| 5,210,883 | A | * | 5/1993 | Weber | E04C 2/521 4/252.2 |
| 6,035,589 | A | * | 3/2000 | Schmucki | E03D 11/146 403/231 |
| 6,128,787 | A | * | 10/2000 | Krist | E03D 11/146 4/300 |

(Continued)

FOREIGN PATENT DOCUMENTS

| DE | 2457953 A | * | 6/1976 | ........... E03D 11/146 |
|---|---|---|---|---|
| DE | 2637749 A1 | | 2/1978 | |

(Continued)

*Primary Examiner* — Eret C McNichols
(74) *Attorney, Agent, or Firm* — Bayramoglu Law Offices LLC

(57) ABSTRACT

A mounting bracket includes a bracket body, a locking assembly and support foot. The bracket body is configured for component installation. The locking assembly is arranged on the bracket body, and the support foot is arranged on the bracket body. The support foot is slide along the up and down direction of the bracket body, and the locking assembly is configured to lock the support foot at a preset position. Through the above structure, the support foot is installed on the ground and used to support the bracket body, and the locking assembly locks the support foot at a preset position to correspondingly adjust the height of the bracket body from the ground, so as to adjust the suspension height of the components installed on the bracket body.

6 Claims, 4 Drawing Sheets

(56) References Cited

U.S. PATENT DOCUMENTS

| | | | | |
|---|---|---|---|---|
| 8,468,615 B2 * | 6/2013 | Tremp | ................ | E03D 11/146 |
| | | | | 4/252.2 |
| 10,358,805 B2 * | 7/2019 | Tanimoto | .............. | E03D 11/146 |

FOREIGN PATENT DOCUMENTS

| | | | | | |
|---|---|---|---|---|---|
| DE | 4415015 | A1 | * | 11/1995 | ............. E03D 1/012 |
| DE | 29803307 | U1 | * | 7/1998 | ........... E03D 11/146 |
| DE | 20121043 | U1 | * | 3/2002 | |
| DE | 10210494 | C1 | * | 12/2003 | |
| DE | 102013203941 | A1 | * | 9/2014 | |
| DE | 102014109276 | A1 | * | 1/2016 | |
| DE | 202018001327 | U1 | * | 1/2019 | |
| DE | 202020003130 | U1 | * | 10/2020 | |
| DE | 102020128131 | A1 | * | 4/2022 | |
| EP | 731223 | A1 | * | 9/1996 | ........... E03D 11/146 |
| EP | 0731223 | A1 | * | 9/1996 | |
| EP | 1335077 | A1 | | 8/2003 | |
| EP | 1674627 | A2 | * | 6/2006 | ........... E03D 11/146 |
| EP | 2740849 | B1 | | 11/2018 | |
| EP | 1990474 | B1 | | 1/2019 | |
| EP | 3431674 | A1 | | 1/2019 | |
| EP | 3470587 | A1 | * | 4/2019 | |
| EP | 3392417 | B1 | * | 7/2021 | ............. E03C 1/057 |
| FR | 2908141 | A1 | * | 5/2008 | ........... E03D 11/146 |
| FR | 2942817 | A1 | * | 9/2010 | ............. E03C 1/324 |
| GB | 2401119 | A | * | 11/2004 | ........... E03D 11/125 |
| GB | 2500421 | A | * | 9/2013 | ........... E03D 11/143 |
| WO | 2016162352 | A1 | | 10/2016 | |

\* cited by examiner

A-A

MOUNTING BRACKET

CROSS REFERENCE TO THE RELATED APPLICATIONS

This application is based upon and claims priority to Chinese Patent Application No. 202122642278.7, filed on Oct. 29, 2021, the entire contents of which are incorporated herein by reference.

TECHNICAL FIELD

The disclosure relates to the technical field of bathroom installation, in particular to a mounting bracket.

BACKGROUND

In the prior art, the water tank components, toilet parts and other components assembled on the same mounting bracket are suspended from the ground to facilitate the user's cleaning of the ground. Wherein, the height of these components suspended from the ground is constant. Therefore, it is difficult to meet the user's requirements for the suspension height during actual installation.

SUMMARY

The disclosure aims to solve at least one of the technical problems existing in the prior art. Therefore, the disclosure is to provide a mounting bracket, which can adjust the suspension height of components installed on the mounting bracket to meet the requirements of users during actual installation.

According to the embodiment of the disclosure, a mounting bracket, including a bracket body, a locking assembly and a support foot. The bracket body is configured for component installation, the locking assembly is arranged on the bracket body, and the support foot is arranged on the bracket body, wherein the support foot is able to slide along the up-down direction of the bracket body, and the locking assembly is configured to lock the support foot at the preset position.

According to the embodiment of the disclosure, it has at least the following advantageous effects: through the above structure, the support foot is installed on the ground and used to support the bracket body, and the locking assembly can lock the support foot at the preset position, so as to correspondingly adjust the height of the bracket body from the ground, so that the suspension height of the components installed on the bracket body can be adjusted.

According to the embodiment of the disclosure, the support foot is provided with a sliding chute arranged in the up-down direction and a guide hole communicated with the sliding chute. The locking assembly includes a slider and a fastener. The slider is slidably arranged in the sliding chute, and the fastener is passed through the bracket body and the guide hole in sequence, and the fastener is threaded with the slider, wherein the fastener and the slider cooperate to lock the support foot at the preset position of the bracket body.

According to the embodiment of the disclosure, wherein the bracket body is provided with an accommodation cavity, and the support foot is slidably arranged in the accommodation cavity.

According to the embodiment of the disclosure, wherein the bracket body includes an integrally formed frame body and an accommodation cylinder, the accommodation cavity is arranged in the accommodation cylinder, and the frame body is configured for an installation of a component.

According to the embodiment of the disclosure, wherein the frame body is a plate-shaped structure, and a surface of the frame body is provided with a recessed stiffener.

According to the embodiment of the disclosure, wherein the frame body is a plate-shaped mechanism, a back of the frame body is provided with a recessed portion, and the recessed portion is filled with grid stiffeners.

According to the embodiment of the disclosure, wherein the frame body is provided with a mounting hole for connecting with a mounting part of the corresponding component.

According to the embodiment of the disclosure, wherein the frame body is provided with an avoidance hole, a hole wall of the avoidance hole is provided with an extension arm, and the extension arm is configured to support the corresponding component.

According to the embodiment of the disclosure, wherein the extension arm is provided with a positioning insert column, and the positioning insert column is configured for positioning connection with the corresponding component.

According to the embodiment of the disclosure, the frame body, the accommodation cylinder and the support foot is made of aluminum.

BRIEF DESCRIPTION OF THE DRAWINGS

The above and/or additional aspects and advantages of the disclosure will become apparent and easy to understand from the description of the embodiment in combination with the following drawings, wherein.

REFERENCE MARK

Figure 1:
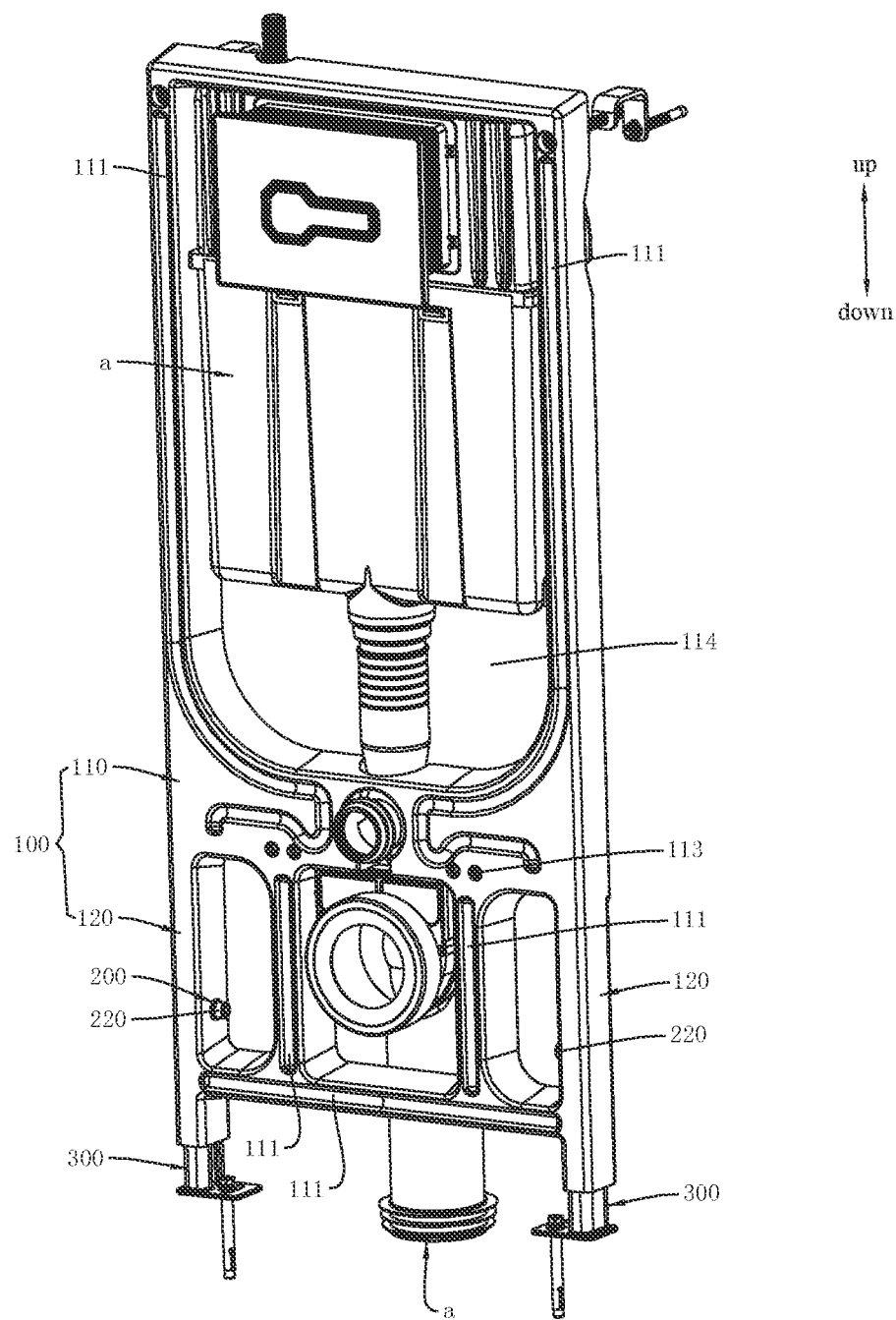
FIG. 1 is a structural diagram of one embodiment of the mounting bracket of the disclosure with components.

Bracket body 100, frame body 110, recessed stiffener 111, recessed portion 112, grid stiffener 112A, mounting hole 113, avoidance hole 114, extension arm 114A, positioning insert column 114A1, accommodation cylinder 120, through hole 121, Locking assembly 200, slider 210, fastener 220, Support foot 300, sliding chute 310, guide hole 320, Component a.

DETAILED DESCRIPTION OF THE EMBODIMENTS

This part will describe the specific embodiment of the invention in detail. The preferred embodiment of the invention is shown in the attached drawings. The function of the attached drawings is to supplement the description of the text part of the description with graphics, so that people can intuitively and vividly understand each technical feature and the overall technical solution of the invention, but it cannot be understood as a limitation on the scope of the invention.

In the description of the invention, if there is a description that the first, second, third, fourth, fifth, etc. are only used to distinguish the technical features, tit cannot be understood as indicating or implying the relative importance, or implicitly indicating the number of the indicated technical features, or implicitly indicating the order of the indicated technical features.

In the description of the invention, it should be understood that the orientation or position relationship related to the orientation description, such as up, down, front, rear, left, right, etc., is based on the orientation or position relationship shown in the attached drawings, only for the convenience of describing the invention and simplifying the description, rather than indicating or implying that the device or element must have a specific orientation, or being constructed and operated in a specific orientation. Therefore, it cannot be understood as a limitation of the present invention.

In the invention, unless otherwise clearly defined, "provide", "install", "connected" and other words shall be understood in a broad sense. For example, it may be directly connected or indirectly connected through an intermediate medium; it may be fixed connection, detachable connection or integrated forming; it may be mechanical connection; it may be the connection between two elements or the interaction between two elements. Those skilled in the art can reasonably determine the specific meaning of the above words in the invention in combination with the specific contents of the technical solution.

Referring to FIGS. 1 to 4, the embodiment of the disclosure relates to a mounting bracket, which includes a bracket body 100, a locking assembly 200 and a support foot 300.

The bracket body 100 is used for the installation of component a, the locking assembly 200 is arranged on the bracket body 100, the support foot 300 are arranged on the bracket body 100, the support foot 300 can slide along the up-down direction of the bracket body 100, and the locking assembly 200 can lock the support foot 300 in a preset position.

Through the above structure, the support foot 300 is installed on the ground and used to support the bracket body 100, and the locking assembly 200 can lock the support foot 300 at the preset position, so as to correspondingly adjust the height of the bracket body 100 from the ground, so that the suspension height of the components a installed on the bracket body 100 can be adjusted.

It can be understood that the locking assembly 200 can lock the support foot 300 in a preset position, and the preset position is the position of the support foot 300 relative to the bracket body 100.

Figure 2:
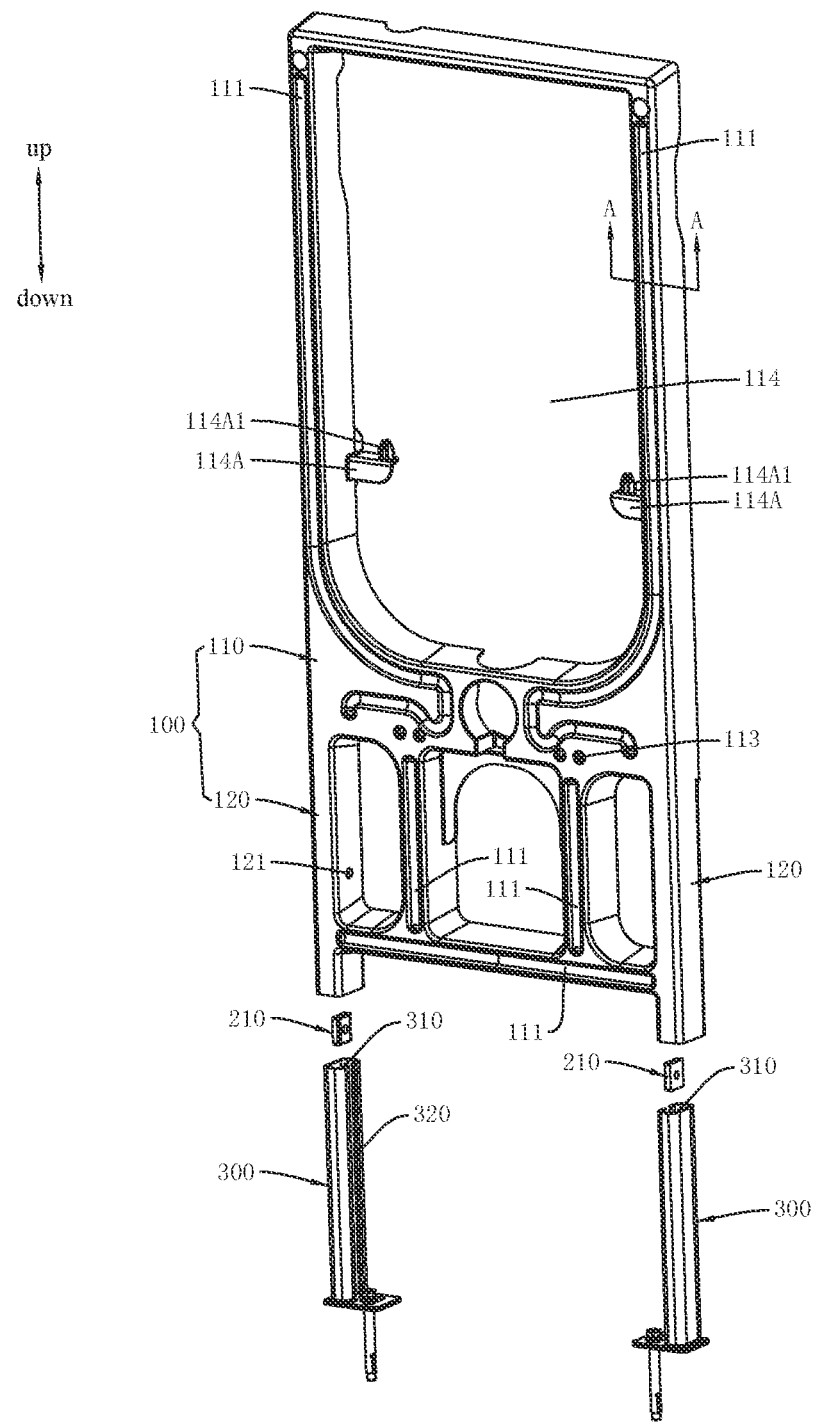
FIG. 2 is a partial exploded view of the mounting bracket shown in FIG. 1.

Referring to FIGS. 1 and 2, the bracket body 100 is provided with an accommodation cavity, and the support foot 300 is slidably arranged in the accommodation cavity. The support foot 300 can be retracted into the accommodation cavity to reduce the space occupied by the mounting bracket.

It should be noted that the user can lock the support foot 300 at the preset position through the locking assembly 200, so that the part of the support foot 300 corresponding to the preset position extends out of the accommodation cavity. In this embodiment, referring to FIG. 1, FIG. 2 and FIG. 4, the bracket body 100 includes an integrally formed frame body 110 and an accommodation cylinder 120, the accommodation cylinder 120 is provided with the above accommodation cavity, and the frame body 110 is used for the installation of component a.

Through the above structure, the bracket body 100 is cast in integrated molding, and its appearance surface has better flatness.

In the present embodiment, the frame body 110, the accommodation cylinder 120 and the support foot 300 are made of aluminum.

Through the above structure, the surface of aluminum profile will naturally produce a dense oxide layer, so that the mounting bracket can obtain a better corrosion resistance without surface spraying or baking paint and other treatment.

Referring to FIGS. 1 to 2, the support foot 300 is a strip structure, the support foot 300 is provided with a sliding chute 310 extending in the up-down direction, and a guide hole 320 communicated with the sliding chute 310, the guide hole 320 extends in the up-down direction, and the cylinder wall of the accommodation cylinder 120 is provided with a through hole 121 communicated with the accommodation cavity.

The locking assembly 200 includes a slider 210 and a fastener 220.

Referring to FIGS. 1 and 2, the slider 210 is slidably arranged in the sliding chute 310, the fastener 220 is passed through the through hole 121 and the guide hole 320 in sequence, and the fastener 220 is threaded with the slider 210, wherein the fastener 220 can be arranged as a bolt, etc. In this embodiment, the slider 210 is a block structure, and the sliding chute 310 cooperates with the slider 210 so that the rotating fastener 220 can drive the slider 210 to move in the direction close to the fastener 220, so that the fastener 220 and the slider 210 together clamp the bracket body 100 and the support foot 300, so as to lock the support foot 300 in the preset position.

It can be understood that the rotating fastener 220 can also drive the slider 210 to move away from the fastener 22, so that the fastener 220 and the slider 210 no longer clamp the support body 100 and the support foot 300. At this time, the user can drive the support foot 300 to slide relative to the locking assembly 200 to adjust the support foot 300 to another preset position.

Figure 3:
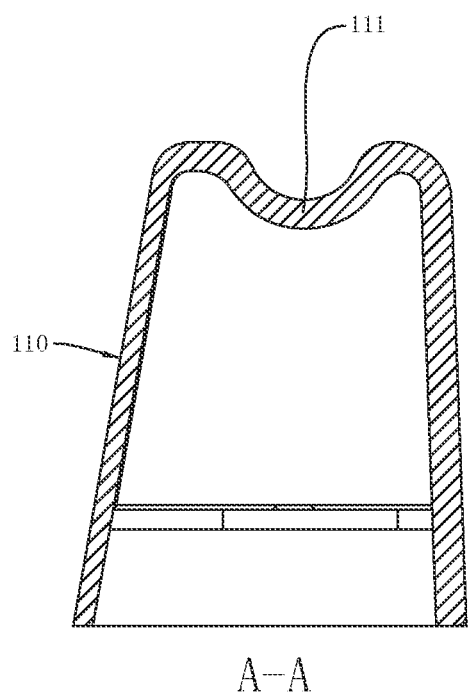
FIG. 3 is a sectional view of A-A shown in FIG. 2.

Referring to FIG. 1, FIG. 2 and FIG. 3, the frame body 110 is a plate-shaped structure, and the surface of the frame body 110 is provided with recessed stiffeners 111.

Through the above structure, on the one hand, the recessed stiffeners 111 arranged on the surface of the frame body 110 can prevent the front and rear bending deformation of the frame body 110; on the other hand, the recessed stiffener 111 can improve the three-dimensional sense of the product.

It can be understood that the recessed stiffener 111 is a groove wall of a groove arranged on the surface of the frame body 110.

Figure 4:
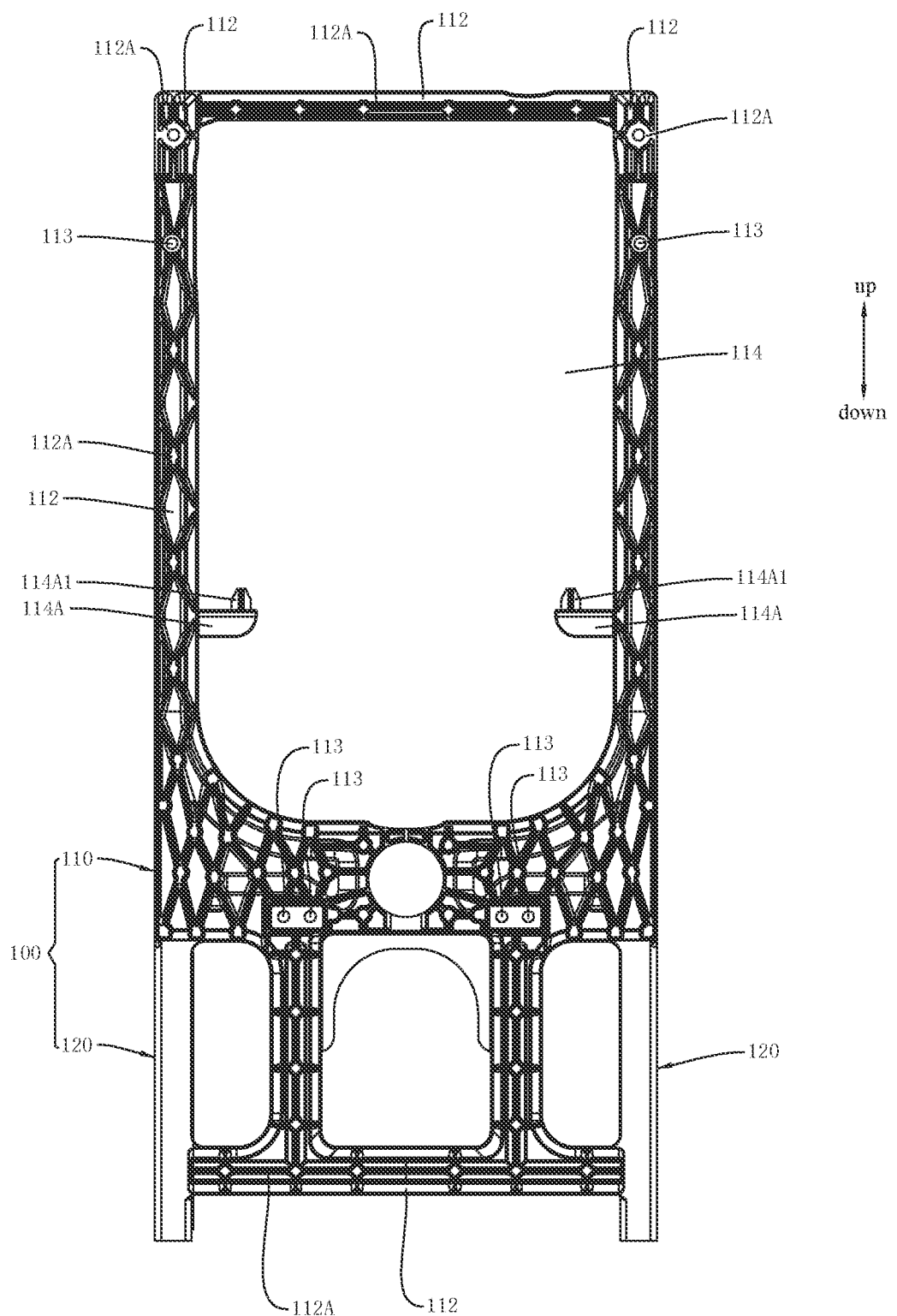
FIG. 4 is a structural diagram of the mounting bracket shown in FIG. 1.

Referring to FIG. 4, the back of the frame body 110 has a recessed portion 112 filled with grid stiffeners 112A.

Through the above structure, on the one hand, the grid stiffener 112A located in the recessed portion 112 is reasonably arranged according to the difference of stress characteristics, so that the frame body 110 has both light weight and strength meeting the installation requirements; on the other hand, the main grid point of the grid stiffeners 112 A can be used as the force point of the thimble when the die is out.

It can be understood that the frame body 110, the accommodation cylinder 120, the recessed stiffener 111 and the grid stiffener 112A are an integrated structure, that is, the bracket body 100 is an integrated casting structure.

In this embodiment, referring to FIG. 1 and FIG. 4, the frame body 110 is provided with a mounting hole 113 for connecting with the mounting part on the corresponding component a. Wherein, the corresponding component a is water tank assembly, toilet parts, drainage pipe fittings, etc.

In this embodiment, referring to FIGS. 1 to 2, the frame body 110 is provided with an avoidance hole 114, the hole wall of the avoidance hole 114 is provided with an extension arm 114A, and the extension arm 114A is used to support the corresponding component a. Wherein, the corresponding component a is the water tank assembly.

Through the above structure, the setting of the extension arm 114 A can improve the connection stability between the corresponding component a and the frame body 110.

In the present embodiment, referring to FIGS. 1 to 2, the extension arm 114A is provided with a positioning insert 114a1, which is used for positioning connection with the corresponding component A. The corresponding part a is the water tank assembly.

Through the above structure, the corresponding component a can be conveniently positioned and installed on the frame body 110.

Of course, the present invention is not limited to the above embodiments. Those skilled in the art can also make equivalent modification or replacement without departing the spirit of the invention. These equivalent modification and replacement are included in the scope defined by the claims of the application.

What is claimed is:

1. A mounting bracket, comprising:
   a bracket body configured for an installation of a component;
   a locking assembly arranged on the bracket body;
   a support foot arranged on the bracket body, wherein the support foot is able to slide along an up-down direction of the bracket body, and the locking assembly is configured to lock the support foot at a preset position; the support foot is provided with a sliding chute arranged in the up-down direction and a guide hole communicated with the sliding chute; the locking assembly comprises:
   a slider slidably arranged in the sliding chute;
   a fastener, wherein the fastener passes through the bracket body and the guide hole in sequence, and the fastener is threaded with the slider, wherein, the fastener and the slider cooperate to lock the support foot at the preset position of the bracket body;
   wherein the bracket body is provided with an accommodation cavity, and the support foot is slidably arranged in the accommodation cavity;
   wherein the bracket body comprises a frame body and an accommodation cylinder, the frame body and the accommodation cylinder are integrally formed, the accommodation cavity is arranged in the accommodation cylinder, and the frame body is configured for the installation of the component, wherein the frame body is a plate-shaped structure, and a surface of the frame body is provided with a recessed stiffener.

2. The mounting bracket according to claim 1, wherein the frame body is a plate-shaped mechanism, a back of the frame body is provided with a recessed portion, and the recessed portion is filled with grid stiffeners.

3. The mounting bracket according to claim 1, wherein the frame body is provided with a mounting hole for connecting with a mounting part of the component corresponding to the mounting hole.

4. The mounting bracket according to claim 1, wherein the frame body is provided with an avoidance hole, a hole wall of the avoidance hole is provided with an extension arm, and the extension arm is configured to support the component corresponding to the extension arm.

5. The mounting bracket according to claim 4, wherein the extension arm is provided with a positioning insert column, and the positioning insert column is configured for positioning connection with the component corresponding to the positioning insert column.

6. The mounting bracket according to claim 1, wherein the frame body, the accommodation cylinder and the support foot are made of aluminum.

\* \* \* \* \*